(12) United States Patent
Szymczak et al.

(10) Patent No.: US 11,033,801 B2
(45) Date of Patent: Jun. 15, 2021

(54) DETACHABLE POWERED PUSH CARTS

(71) Applicants: Michael Szymczak, Boring, OR (US); Linda Szymczak, Boring, OR (US)

(72) Inventors: Michael Szymczak, Boring, OR (US); Linda Szymczak, Boring, OR (US)

( * ) Notice: Subject to any disclaimer, the term of this patent is extended or adjusted under 35 U.S.C. 154(b) by 277 days.

(21) Appl. No.: 16/252,225

(22) Filed: Jan. 18, 2019

(65) Prior Publication Data
US 2020/0230487 A1 Jul. 23, 2020

(51) Int. Cl.
| | |
|---|---|
| *A63C 17/12* | (2006.01) |
| *B62M 6/10* | (2010.01) |
| *B62M 6/40* | (2010.01) |
| *B62M 6/00* | (2010.01) |
| *B60D 1/167* | (2006.01) |
| *B60D 1/02* | (2006.01) |

(52) U.S. Cl.
CPC ............... *A63C 17/12* (2013.01); *B60D 1/02* (2013.01); *B60D 1/167* (2013.01); *B62M 6/10* (2013.01); *B62M 6/40* (2013.01); *B62K 2204/00* (2013.01); *B62M 6/00* (2013.01)

(58) Field of Classification Search
CPC ....... B62K 2204/00; B62M 6/40; B62M 6/10; B62M 6/00; A63C 17/12
USPC .................. 180/180, 181, 14.2, 11
See application file for complete search history.

(56) References Cited

U.S. PATENT DOCUMENTS

| | | | | |
|---|---|---|---|---|
| 5,127,488 A | * | 7/1992 | Shanahan | A63C 17/12 180/11 |
| 6,725,955 B2 | * | 4/2004 | Bidwell | B62M 7/16 180/11 |
| 9,795,864 B1 | * | 10/2017 | Bao | A63C 17/0046 |
| 2008/0023234 A1 | * | 1/2008 | Wang | B62D 59/04 180/14.2 |

* cited by examiner

*Primary Examiner* — Minnah L Seoh
*Assistant Examiner* — Hosam Shabara

(57) ABSTRACT

A method, system, apparatus, and/or device for propelling a non-motorized vehicle forward. The method, system, apparatus, and/or device may include a frame, a first wheel, a second wheel, a motor, a controller, and a bracket. The frame may attach to the first wheel, the second wheel, and the motor. The first wheel may attach to a first side of the frame and rotate about an axis. The second wheel may attach to a second side of the frame and rotate about the axis. The motor may connect to the first wheel, where the motor is configured to rotate the first wheel to propel the apparatus forward. The controller may control a speed at which the motor rotates the first wheel. The bracket may attach to a front of the first frame and connect to a non-motorized vehicle.

20 Claims, 8 Drawing Sheets

DETACHABLE POWERED PUSH CARTS

BACKGROUND

Non-motorized wheeled vehicles can be used for a number of different purposes. For example, a skateboard is a non-motorized vehicle with a short narrow board with two small wheels fixed to the bottom of either end, on which a person can ride in a standing or crouching position and propel themselves by occasionally pushing one foot against the ground. A skateboard rider may ride the skateboard as they perform tricks or compete in a sporting competitions. Similarly, a bicycle is a non-motorized vehicle with two wheels held in a frame one behind the other, propelled by pedals and steered with handlebars attached to the front wheel. A bicycle rider may ride the bicycle for leisure, transportation, sports, recreation, or to perform tricks. As some points in time, the rider of the non-motorized wheeled vehicles may want to propel the non-motorized vehicle by pedaling or pushing it with his/her foot. At other points in time, the rider may desire to simply ride the non-motorized vehicle without having to physically exert themselves to propel the non-motorized vehicle.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

DETAILED DESCRIPTION

Figure 1:
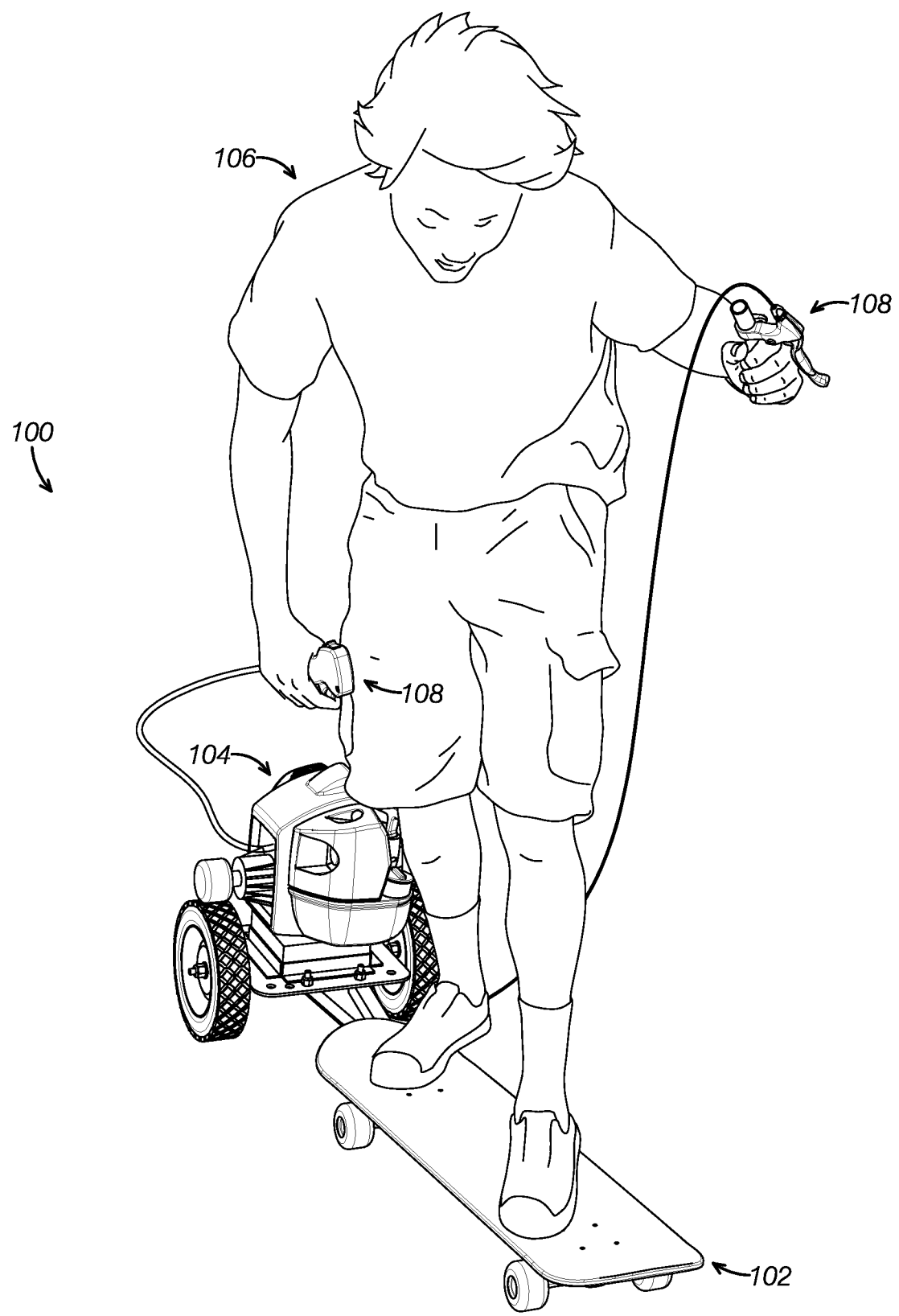
FIG. 1 illustrates a detachable powered push cart connected to a non-motorized vehicle, according to an embodiment.

The disclosed detachable powered push carts will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of detachable powered push cart examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Non-motorized wheeled vehicles may include vehicles with one or more wheels that may be propelled without the need for a motor or engine. The non-motorized wheeled vehicles may include skateboards, scooters, wagons, bicycles, and so forth. The non-motorized wheeled vehicles may be used for a number of different purposes or environments. For example, an individual may ride a skateboard to perform tricks or compete in sporting competitions. In another example, an individual may ride a bicycle for leisure purposes, transportation purposes, or recreational purposes. In another example, an individual may use a wagon move objects between different locations.

As some points in time and/or for some conditions, the user of the non-motorized wheeled vehicles may want to propel the non-motorized vehicle by pedaling, pushing, or pulling the vehicle. At other points in time and/or for other conditions, the user may desire to simply use the non-motorized vehicle without having to physically exert themselves to propel the non-motorized vehicle. Conventionally, for an individual to propel a non-motorized vehicle without physically exerting themselves, the individual must install a motor conversion kit to the non-motorized vehicle. For example, if the individual desires to use a skateboard without physically exerting himself/herself, the user may remove the wheels from the skateboard install a motor onto the board, connect the wheels to the motor, and then the motor may drive the wheels. Similarly, when the individual desires to use a bicycle without physically exerting himself/herself, the user may remove the wheels from the bicycle, install a motor onto the frame of the bicycle, connect one of the wheels to the motor, and then the motor may drive the wheel. However, the conventional motor conversion kit is permanent and may limit the usability of the converted non-motorized vehicle. For example, when a conventional motor conversion kit is installed to a skateboard, the individual may use the skateboard without exerting himself/herself, but the individual may no longer use the skateboard to perform tricks, for sports, or for competitions because the conversion kit may make the skateboard to heavy, may interfere with the individuals tricks (such as grinding or flips), and/or may not be allowed in competitions. The conventional conversion kit may similarly restrict the usability of other non-motorized vehicles, such as bicycles, scooters, wagons, and so forth.

Implementations of the disclosure address the above-mentioned deficiencies and other deficiencies by providing a method, system, device, and/or apparatus to propel a non-motorized vehicle without permanently affixing a motor to the non-motorized vehicle. The method, system, device, or apparatus may utilize a powered push cart. The powered push cart may include a frame, a motor, a connector, and wheels. The powered push cart may be detachably connected to a non-motorized vehicle and the motor and wheel may propel the non-motorized vehicle. When the individual no longer desires to have the powered push cart propel the non-motorized vehicle, the individual may detach the powered push cart from the non-motorized vehicle and use the non-motorized vehicle as normal. An advantage of the detachable powered push cart may be to propel a non-motorized vehicle when the user desires to not physically exert himself/herself while being able to detach the detachable powered push cart when the user desires to use the non-motorized vehicle as normal. For example, when a user desires to ride a skateboard to a skate park, the user may attach the detachable powered push cart to the skateboard so that the detachable powered push cart may propel the skateboard as the user travels to the skate park and then the user may detach the detachable powered push cart from the skateboard so that the user may use the skateboard to perform tricks at the skate park. Another advantage of the detachable powered push cart may be to provide the user with a temporary motor for their non-motorized vehicle without having to permanently affix a motor to the non-motorized vehicle.

FIG. 1 illustrates a detachable powered push cart 100 connected to a non-motorized vehicle 102, according to an embodiment. In one embodiment, a user 106 may desire to ride the non-motorized vehicle 102 from a first location to a second location without having to physically exert himself/herself to propel the non-motorized vehicle 102. To enable the user 106 to propel the non-motorized vehicle 102 without physical exertion, the user 106 may attach the detachable powered push cart 100 to the non-motorized vehicle 102.

When the detachable powered push cart 100 is attached to the non-motorized vehicle 102, the user 106 may control the detachable powered push cart 100 with a controller 108. The controller 108 may be a hand controller that the user 106 may use to control a motor 104 of the detachable powered push cart 100. For example, the controller 108 may include a speed control and a brake control. When the user 106 desires to accelerate or increase the speed of the non-motorized vehicle 102, the user may engage the speed control of the controller 108 to cause the motor 104 of the detachable powered push cart 100 to increase the amount of forward force applied to the non-motorized vehicle 102 and thereby increase the speed. When the user 106 desires to deaccelerate or stop the non-motorized vehicle 102, the user 106 may engage the brake control of the controller 108.

In one embodiment, the detachable powered push cart 100 may be connected to a rear of the non-motorized vehicle 102 to propel the non-motorized vehicle 102 from behind. In another embodiment, the detachable powered push cart 100 may be connected to a front of the non-motorized vehicle 102 to pull the non-motorized vehicle 102 from in front. The non-motorized vehicle 102 may be a skateboard, a scooter, a bicycle, a wagon, a cart, or other vehicles with wheels that do not include a motor or engine. As discussed herein, the detachable powered push cart 100 may include an adapter to non-permanently or detachably connect to the non-motorized vehicle 102.

Figure 2:
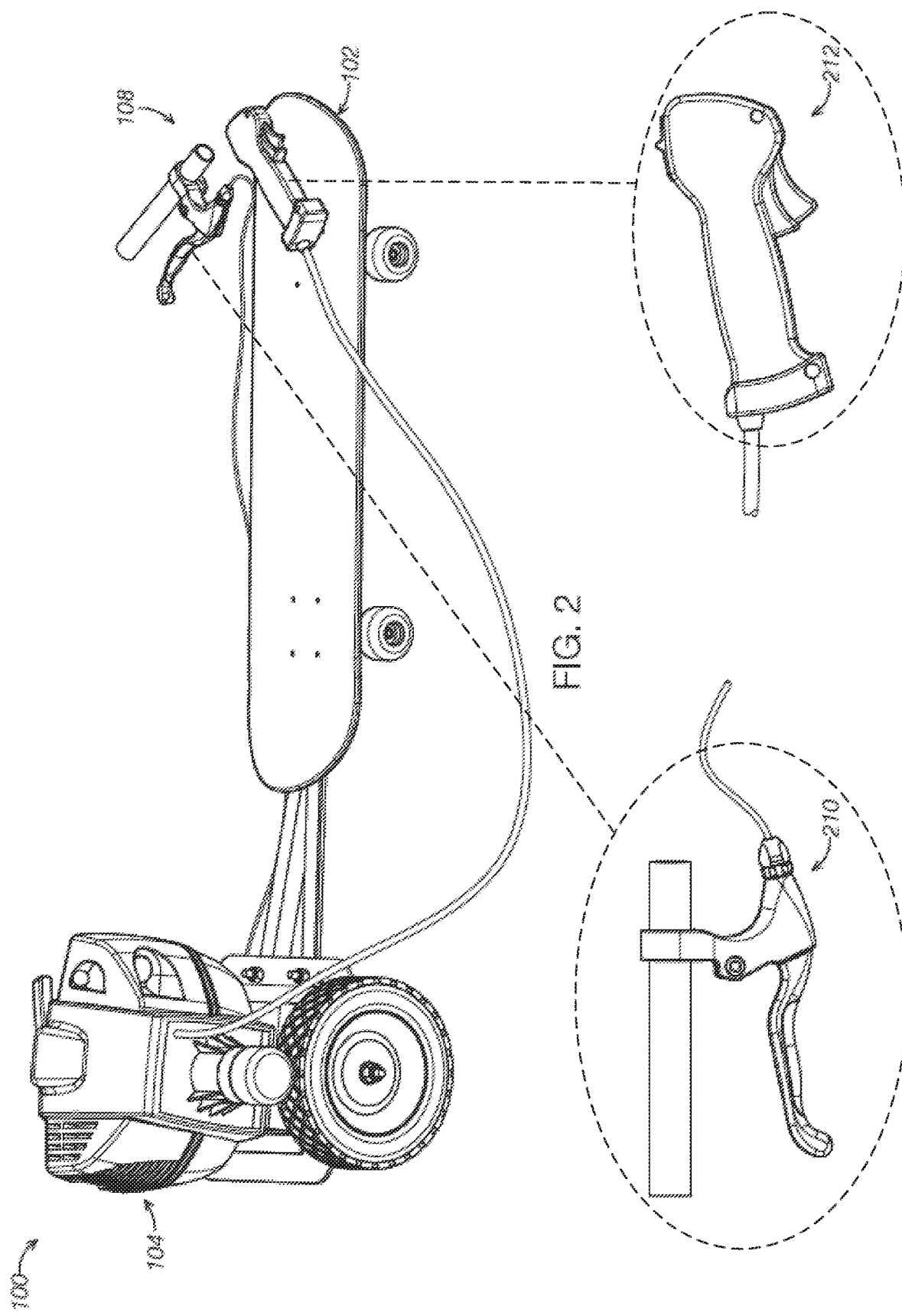
FIG. 2 illustrate the detachable powered push cart where the controller includes a speed control and a brake control, according to an embodiment.

FIG. 2 illustrates the detachable powered push cart 100 where the controller 108 includes a speed control 210 and a brake control 212, according to an embodiment. Some of the features in FIG. 2 are the same or similar to some of the features in FIG. 1 as noted by same reference numbers, unless expressly described otherwise. As discussed above, the detachable powered push cart 100 may be attached to the non-motorized vehicle 102 to propel the non-motorized vehicle 102. The speed, the acceleration, the deceleration, and the braking of the detachable powered push cart 100 may be controlled by the controller 108. In one embodiment, the controller 108 may be a handheld controller that a user may hold in one or two hands as the user rides or uses the non-motorized vehicle 102.

In one embodiment, the controller 108 may include an speed control 210 and a brake control 212. In one example, the speed control 210 and the brake control 212 may be separate controls. In another example, the speed control 210 and the brake control 212 may be a single integrated control. In one example, the speed control 210 and/or the brake control 212 may be a push/pull hand control for an operator to operate the accelerator and brake of the detachable powered push cart 100 by hand. For example, to operate the push/pull hand control, the operator may push a regulator (such as a paddle, a lever, a button, and so forth) forward to brake and pull the regulate backward to accelerate. In another example, the speed control 210 and/or the brake control 212 may be a push/twist hand control where an operator may push a handle forward to brake and twist the handle to accelerate. In another example, the speed control 210 and/or the brake control 212 may be a push/rock hand control where an operator may push the control handle forward to brake and rock an upright handle rearward toward the user to accelerate. In another example, the speed control 210 may be a first control to accelerate and the brake control 212 may be a second control to brake. The first control and/or the second control may be a button, a lever, an actuator, a twist handle, a paddle, and so forth.

In one embodiment, the speed control 210 may be static control where the speed control is either on to cause the motor 104 to accelerate or propel the non-motorized vehicle 102 and off to not accelerate or propel the non-motorized vehicle 102. In another embodiment, the speed control 210 may be a dynamic control to control an amount of force or energy by the motor 104 to accelerate or propel the non-motorized vehicle 102. The dynamic control may be based on a configuration of the accelerator, such as the more the accelerator is twisted or the more force that is applied to a level the more the motor 104 accelerates. In another embodiment, the brake control 212 may be static control where the brake control is either on to cause the motor 104 to deaccelerate or brake the non-motorized vehicle 102 and off to not deaccelerate or brake the non-motorized vehicle 102. In another embodiment, the brake control 212 may be a dynamic control to control an amount of deceleration or braking by the motor 104 to deaccelerate or stop the non-motorized vehicle 102. The dynamic control may be based on a configuration of the brake, such as the more the brake is twisted or the more force that is applied to a lever the more the motor 104 deaccelerates or brakes.

Figure 3:
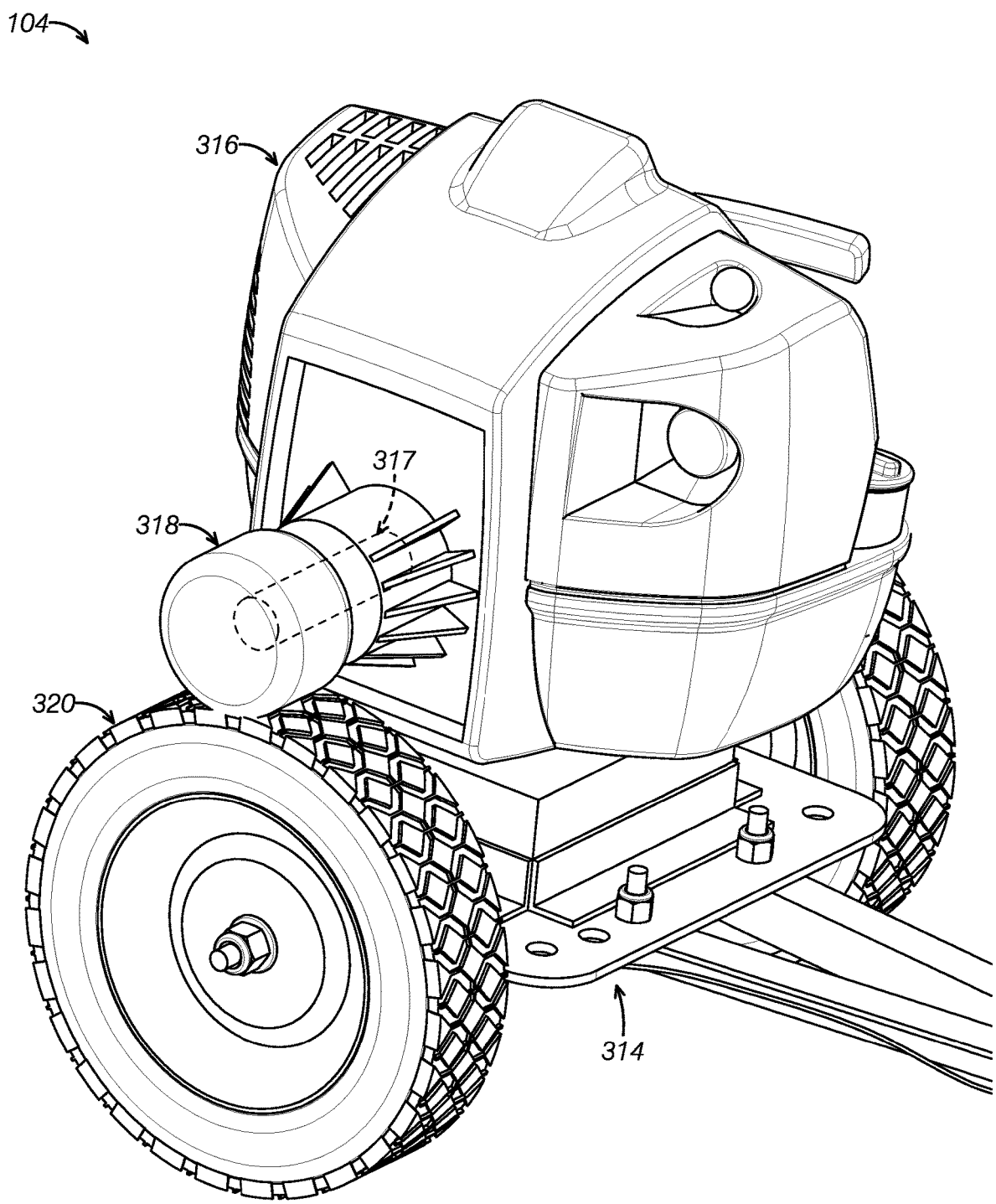
FIG. 3 illustrates the motor of the detachable powered push cart, according to an embodiment.

FIG. 3 illustrates the motor 104 of the detachable powered push cart 100, according to an embodiment. Some of the features in FIG. 3 are the same or similar to some of the features in FIG. 1 as noted by same reference numbers, unless expressly described otherwise. In one embodiment, the motor 104 may be a machine powered by electricity or internal combustion that supplies motive power. The motor 104 may include an engine 316 that may generate mechanical energy or power to drive a wheel 320. In one example, the engine 316 may be attached to a shaft 317 with a roller 318. The engine 316 may rotate or spin the shaft 317 and the roller 318. The roller 318 may be in contact with the wheel 320 to form a friction connection or pressure connection between the roller 318 and the wheel 320.

As the engine 316 spins the shaft 317 and the roller 318, the friction or pressure between the roller 318 and the wheel 320 may cause the wheel 320 to rotate or spin. The wheel 320 may be connected to a frame 314 of the detachable powered push cart 100 such that as the wheel 320 rotates, the wheel 320 may propel the frame 314 forward. The frame 314, in turn, may be connected to a non-motorized vehicle and as the frame 314 is propelled forward the non-motorized vehicle may also be propelled forward. In another embodiment, the engine 316 may be connected directly to the wheel 320 via the shaft 317 or a drive train. In this embodiment, the engine 316 may directly rotate the wheel 320 to propel the frame 314 and the non-motorized vehicle forward. In another embodiment, the detachable powered push cart 100 may include a single wheel 320 that may be located beneath, in front of, or behind the frame. In another embodiment, the detachable powered push cart 100 may include two or more wheels 320 to provide greater stability to the frame 314. In this embodiment, at least one of the two or more wheels may be connected to the engine 316 to propel the frame 314 and the non-motorized vehicle forward.

Figure 4:
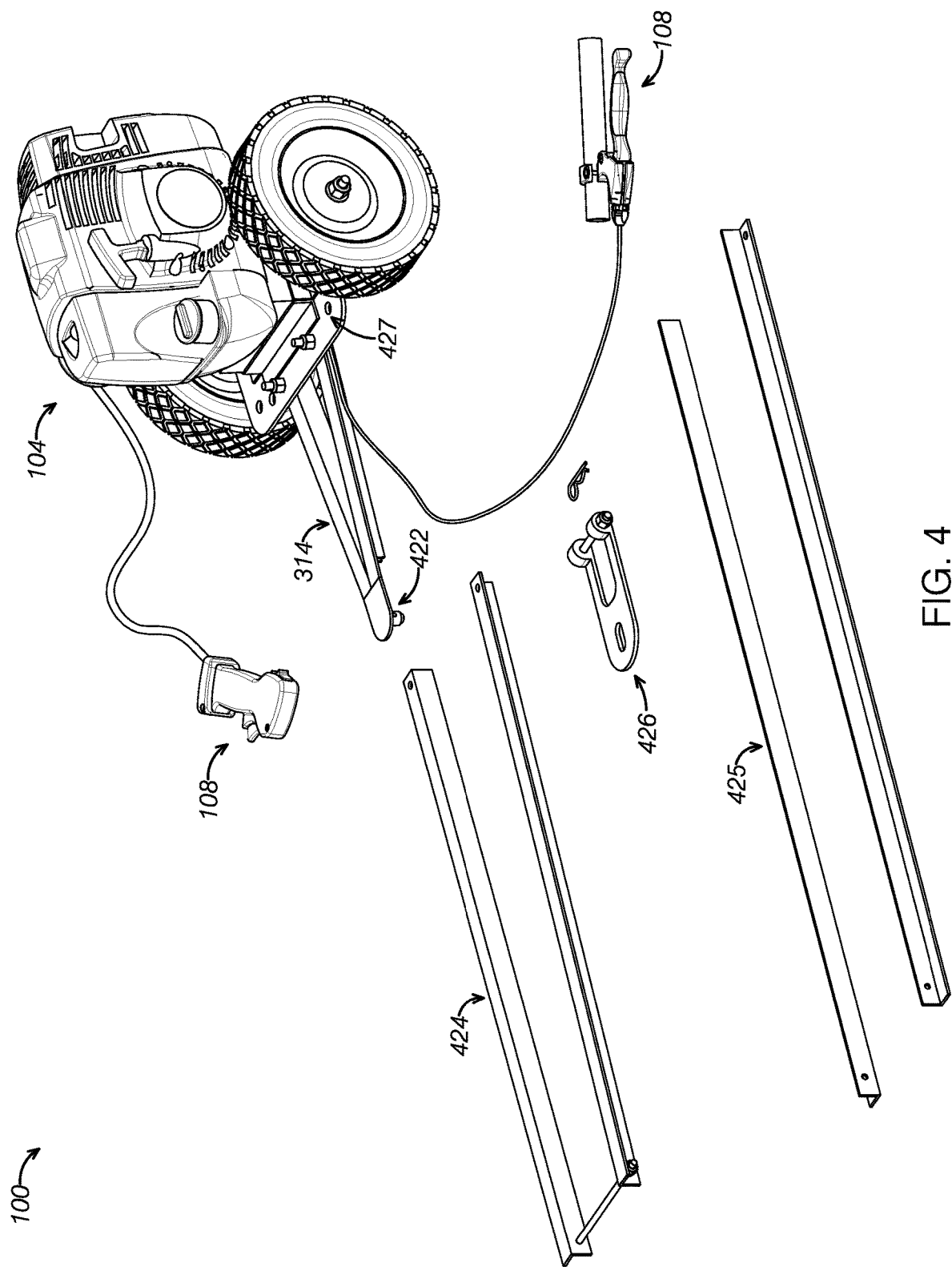
FIG. 4 illustrates the detachable powered push cart with a variety of brackets configured to attach to different non-motorized vehicles, according to an embodiment.

FIG. 4 illustrates the detachable powered push cart 100 with a variety of brackets 424, 425, and 426 configured to attach to different non-motorized vehicles, according to an embodiment. Some of the features in FIG. 4 are the same or similar to some of the features in FIGS. 1 and 3 as noted by same reference numbers, unless expressly described otherwise. As discussed above, the detachable powered push cart 100 may be configured to attach to a variety of different non-motorized vehicles, such as skateboards, scooters, bicycles, wagons, and so forth. To attach the detachable powered push cart 100 to the variety of different non-motorized vehicles, the frame 314 may be configured to attach to the brackets 424, 425, and 426.

In one example, the frame 314 may include a tongue 422 that may extend forward from the frame 314 to attach to a bracket 426 fastened to the non-motorized vehicle, as further discussed below at FIG. 5. In another example, the frame 314 may include fasteners or fastening points to connect the brackets 424 and 426. For example, the frame 314 may include holes 427 on the sides of the frame 314 to receive the first ends of the bracket 424 or 426. In one embodiment, the holes 427 may be bolt holes, where a bolt may be inserted through the first ends of the bracket 424 or 426 and through the holes 427 to connect the bracket 424 or 426 to the frame 314. The brackets 424, 425, and/or 426 may be different lengths or have different connectors on the second end of the brackets 424, 425, or 426 to enable a user to connect the detachable powered push cart 100 to different non-motorized vehicles.

In another embodiment, the tongue 422 may be fixed to the frame 314 to be a default connector to connect directly with the non-motorized vehicle and/or with the bracket 426. In another embodiment, the tongue 422 may be removable and a user may connect whichever tongue 422 and/or bracket 424, 425, or 426 that is need to connect the detachable powered push cart 100 to the non-motorized vehicle. In another embodiment, the frame 314 may include multiple holes 427 along the front and/or sides of the frame 314 to connect to the various tongues 422 and/or brackets 424, 425, and/or 426 forward.

Figure 5A:
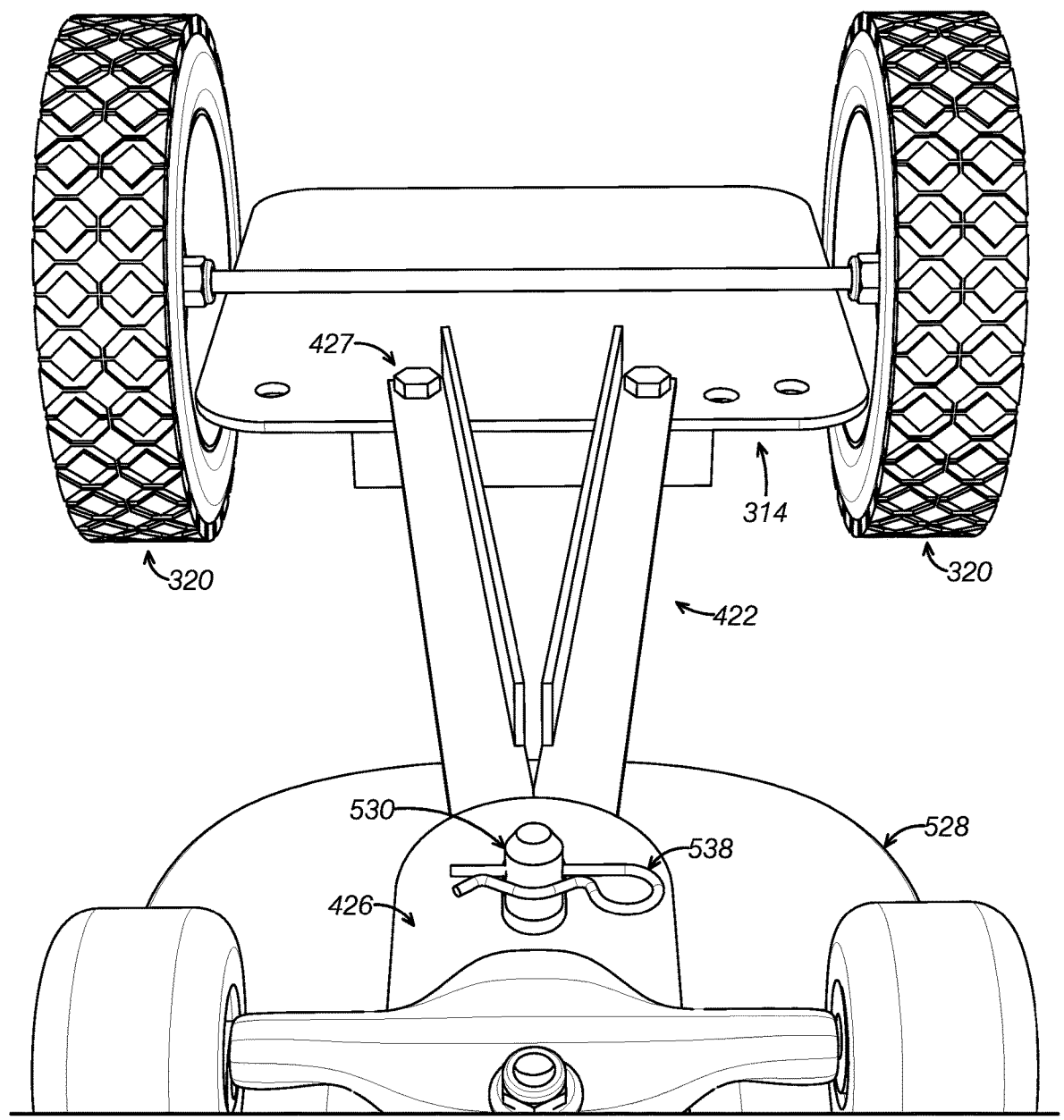
FIG. 5A illustrates the detachable powered push cart with the tongue and bracket connected to a skateboard, according to an embodiment.

FIG. 5A illustrates the detachable powered push cart 100 with the tongue 422 and bracket 426 connected to a skateboard 528, according to an embodiment. Some of the features in FIG. 5A are the same or similar to some of the features in FIGS. 1, 3, and 4 as noted by same reference numbers, unless expressly described otherwise. As discussed above, the detachable powered push cart 100 may be configured to attach to the skateboard 528 so that the detachable powered push cart 100 may propel the skateboard 528.

To attach the detachable powered push cart 100 to the skateboard 528, the tongue 422 may be attached to the frame 314 via the holes 427. For example, the tongue 422 may be a triangularly shaped tongue with two beams connected together at a first end and the beams extending longitudinally at an angle to form the triangle shape. Each of the ends of the triangle may be connected to the frame 314 via one of the holes 427. The point where the beams of the tongue 422 are connected together may include a tow hitch 530 that may be inserted into an opening of the bracket 426, as further discussed and shown in FIG. 5B. The detachable powered push cart 100 may be attached to the skateboard 528 by attaching the bracket 426 to the front wheel bracket or the rear wheel bracket of the skateboard 528 and then inserting the tow hitch 530 into the bracket 426. The detachable powered push cart 100 may be detached from the skateboard 528 by removing the tow hitch 530 from the bracket 426. In one example, a fastener 538, such as a cotter pin, may be inserted into a bottom end of the tow hitch 530 to keep the tow hitch 530 in place while it is attached to the bracket 426.

Figure 5B:
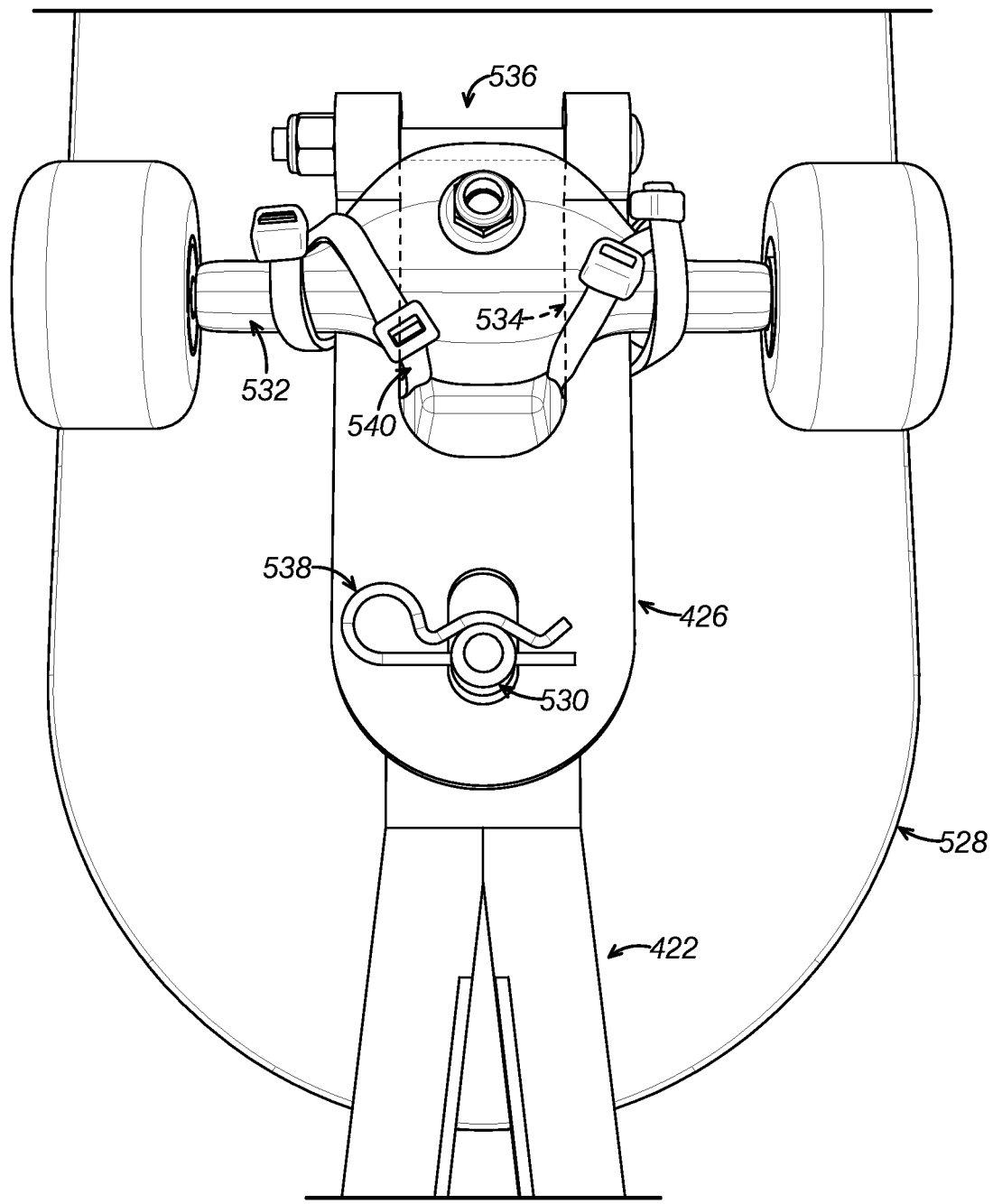
FIG. 5B illustrates a zoomed in view of the bracket connected to a skateboard, according to an embodiment.

FIG. 5B illustrates a zoomed in view of the bracket 426 connected to a skateboard 528, according to an embodiment. Some of the features in FIG. 5B are the same or similar to some of the features in FIGS. 1, 3, 4, and 5A as noted by same reference numbers, unless expressly described otherwise. As discussed above, the detachable powered push cart 100 may be configured to attach to the skateboard 528 so that the detachable powered push cart 100 may propel the skateboard 528 forward. The skateboard 528 may include a wheel bracket 532 for the wheels of the skateboard 528 to connect to. The bracket 426 may include an opening or a channel 534 that may be configured to extend around the portion of the wheel bracket 532 that connects to the skateboard 528. For example, to connect the bracket 426 to the skateboard 528, a user may slide the bracket 426 around the wheel bracket 532.

When the bracket 426 is in place, the user may connect a first fastener 536 in place at the end of the bracket 426 such that the bracket 426 may not slide back off of the wheel bracket 532. For example, the end of the bracket 426 may include nut(s) that a bolt may extend through to connect a first side of the opening or channel 534 to a second side of the opening or channel 534. The first fastener 536 with the bracket 426 may complete a perimeter around the wheel bracket 532 such that the bracket 426 remains fastened to the skateboard 528. To detach the bracket 426 from the skateboard 528, a user may remove the first fastener 536 from the bracket 426 and slide the bracket 426 off of the wheel bracket 532. In another embodiment, a second fastener 540 may further attach the bracket 426 to the wheel bracket 532 to restrict the vertical movement of the bracket 426. For example, the first fastener 536 may horizontally or laterally hold the bracket 426 to the wheel bracket 532 so that the bracket 426 does not move horizontally or laterally and the second fastener 540 may vertically hold the bracket 426 against the wheel bracket 532 so that the bracket 426 does not move vertically. The types of first fastener 536 or the second fastener 540 are not intended to be limiting and the bracket 426 may be connected to the skateboard 528 with other types of fasteners. For example, the fasteners may include bolts, zip ties, anchors pins, cotter pins, screws, and so forth.

Figure 6:
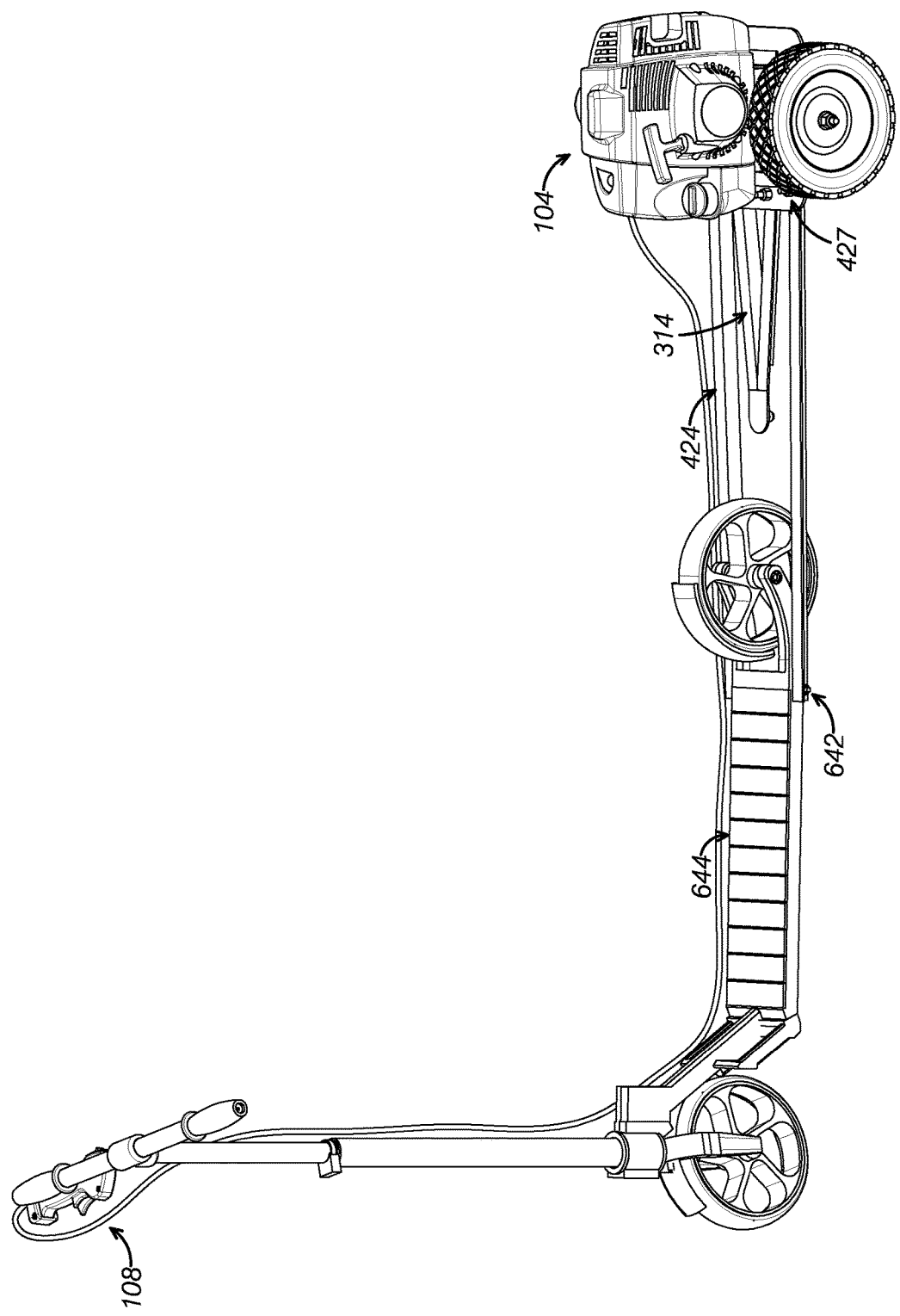
FIG. 6 illustrates the detachable powered push cart with the bracket connected to a scooter, according to an embodiment.

FIG. 6 illustrates the detachable powered push cart 100 with the bracket 424 connected to a scooter 644, according to an embodiment. Some of the features in FIG. 6 are the same or similar to some of the features in FIGS. 1 and 4 as noted by same reference numbers, unless expressly described otherwise. As discussed above, the detachable powered push cart 100 may be configured to attach to the scooter 644 so that the detachable powered push cart 100 may propel the scooter 644 forward.

To attach the detachable powered push cart 100 to the scooter 644, the bracket 424 may be attached to the frame 314 via the holes 427, as shown and discussed above at FIG. 4. For example, the bracket may be a triangularly shaped tongue with two beams connected together at the frame of the scooter 644 and the beams extending longitudinally at an angle to connect to the frame 314 via the holes 427 to form the triangle shape.

In one embodiment, the bracket 424 may extend from the frame 314 and the ends of the brackets 424 may include holes for a fastener 642 (such as a bolt) to extend from a first side of the bracket 424, through a hole or channel in the scooter 644, to a second side of the bracket 424. In another embodiment, a U-bolt may be connected to each side of the bracket 424. The U-bolt may be positioned in front of the back wheel of the scooter 644. The types of fasteners to connect the bracket 424 to the scooter 644 are not intended to be limiting and other types of fasteners may connect the bracket 424 to the scooter 644. For example, the fasteners may include bolts, zip ties, anchors pins, cotter pins, screws, and so forth.

Figure 7:
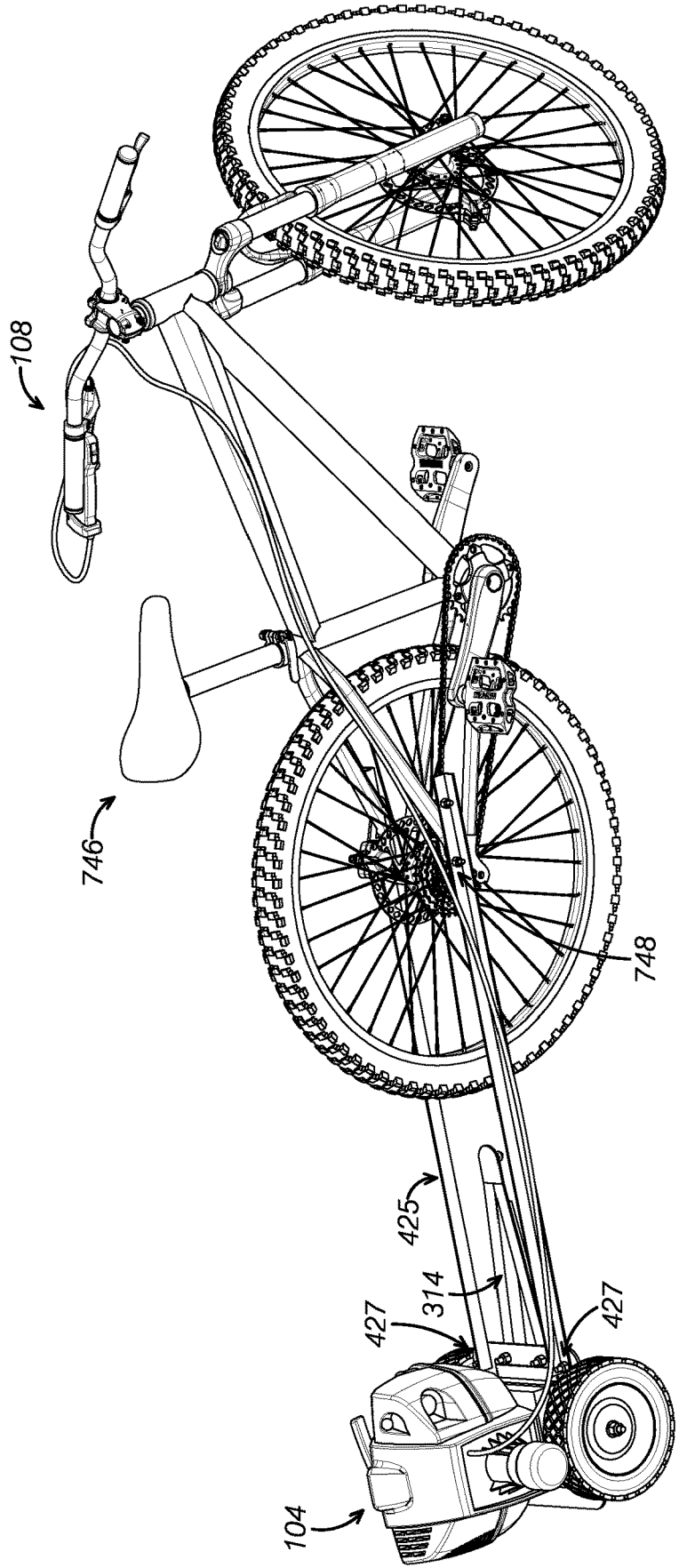
FIG. 7 illustrates the detachable powered push cart with the bracket connected to a bicycle, according to an embodiment.

FIG. 7 illustrates the detachable powered push cart 100 with the bracket 425 connected to a bicycle 746, according to an embodiment. Some of the features in FIG. 7 are the same or similar to some of the features in FIGS. 1 and 4 as noted by same reference numbers, unless expressly described otherwise. As discussed above, the detachable powered push cart 100 may be configured to attach to the bicycle 746 so that the detachable powered push cart 100 may propel the bicycle 746 forward.

To attach the detachable powered push cart 100 to the bicycle 746, the bracket 425 may be attached to the frame 314 via the holes 427, as shown and discussed above at FIG. 4. For example, the bracket 425 may be a triangularly shaped tongue with two beams connected together at the frame 314 of the bicycle 746 and the beams extending longitudinally at an angle to connect to the frame 314 via the holes 427 to form the triangle shape.

In one embodiment, the bracket 425 may extend from the frame 314 and the ends of the brackets 425 may include holes for a fastener 748 (such as a bolt) to extend from a first side of the bracket 425, through a hole or channel in the bicycle 746, to a second side of the bracket 425. In another embodiment, the fastener 748 may be a U-bolt connected to each side of the bracket 425. The U-bolt may be positioned in front of the back wheel of the bicycle 746. In another embodiment, the fasteners 748 may be bolts or fasteners on the frame of the bicycle 746 for the bracket 425 to attach to, such as bolts for the gears or axle of the bicycle 746. The types of fasteners to connect the bracket 425 to the bicycle 746 are not intended to be limiting and other types of fasteners may connect the bracket 425 to the bicycle 746. For example, the fasteners may include bolts, zip ties, anchors pins, cotter pins, screws, and so forth.

In one embodiment, the controller 108 may be connected to the handlebar of the bicycle 746. For example, the speed control of the controller 108 may be attached to a first handle (such as for the right or left hand) of the handlebar and the brake control of the controller 108 may be attached to a second handle (such as for the right or left hand) of the handlebar.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. An apparatus, comprising:
a frame configured to attach to a first wheel, a second wheel, and a motor;
the first wheel configured to attach to a first side of the frame and rotate about an axis;
the second wheel configured to attach to a second side of the frame and rotate about the axis;
the motor configured to connect to the first wheel, wherein the motor is configured to rotate the first wheel to propel the apparatus forward;
a controller configured to control a speed at which the motor rotates the first wheel;
a tongue configured to attach to a front of the frame, the tongue being configured to connect to a bracket; and
the bracket configured to attach to a wheel bracket of a skateboard, wherein when the tongue is attached to the bracket and the frame, the apparatus is configured to propel the skateboard forward based on the speed set by the controller;
wherein the wheel bracket is positioned on a back of the skateboard such that the apparatus pushes the skateboard from behind when the motor is engaged by the controller to propel the apparatus forward; and
wherein the bracket comprises a channel configured to slide around the wheel bracket of the skateboard.

2. The apparatus of claim 1, a fastener configured to attach to a front of the bracket to secure the bracket horizontally to the wheel bracket of the skateboard such that the bracket does not slide off of the wheel bracket of the skateboard.

3. The apparatus of claim 1, a fastener configured to attach around the bracket to secure the bracket vertically to the wheel bracket of the skateboard such that the bracket does not move vertically relative to the wheel bracket of the skateboard.

4. The apparatus of claim 1, further comprising a shaft extending from the motor and a roller attached to an end of the shaft, wherein the roller is in contact with the first wheel to form a friction connection or pressure connection between the roller and the first wheel such that when the motor rotates the roller, the roller rotates the first wheel.

5. The apparatus of claim 1, wherein the controller is a hand controller for a rider of the skateboard to operate while riding the skateboard.

6. The apparatus of claim 1, wherein the controller comprises a speed control and a brake control.

7. The apparatus of claim 6, wherein the speed control is a first hand control and the brake control is a second hand control.

8. The apparatus of claim 6, wherein the speed control and the brake control are integrated into a single hand control.

9. The apparatus of claim 1, wherein the tongue includes a first beam and a second beam, wherein the first beam and the second beam form a triangularly shaped tongue when the first beam and the second beam are connected to the frame.

10. The apparatus of claim 9, wherein the frame comprises a first opening for the first beam to attach to and a second opening for the second beam to attach to.

11. An apparatus, comprising:
a frame configured to attach to a first wheel, a second wheel, and a motor;
the first wheel configured to attach to a first side of the frame and rotate about an axis;
the second wheel configured to attach to a second side of the frame and rotate about the axis;
the motor configured to connect to the first wheel, wherein the motor is configured to rotate the first wheel to propel the apparatus forward;
a controller configured to control a speed at which the motor rotates the first wheel;
a tongue configured to attach to a front of the frame, the tongue being configured to connect to a bracket; and
the bracket configured to attach to a wheel bracket of a skateboard, wherein when the tongue is attached to the bracket and the frame, the apparatus is configured to propel the skateboard forward based on the speed set by the controller;
where in the tongue comprises a tow hitch configured to be inserted into an opening of the bracket.

12. The apparatus of claim 11, further comprising a shaft extending from the motor and a roller attached to an end of the shaft, wherein the roller is in contact with the first wheel to form a friction connection or pressure connection between the roller and the first wheel such that when the motor rotates the roller, the roller rotates the first wheel.

13. The apparatus of claim 11, wherein the controller is a hand controller for a rider of the skateboard to operate while riding the skateboard.

14. The apparatus of claim 11, wherein the controller comprises a speed control and a brake control.

15. The apparatus of claim 14, wherein the speed control is a first hand control and the brake control is a second hand control.

16. The apparatus of claim 14, wherein the speed control and the brake control are integrated into a single hand control.

17. The apparatus of claim 11, wherein the tongue includes a first beam and a second beam, wherein the first beam and the second beam form a triangularly shaped tongue when the first beam and the second beam are connected to the frame.

18. The apparatus of claim 17, wherein the frame comprises a first opening for the first beam to attach to and a second opening for the second beam to attach to.

19. An apparatus, comprising:
a first frame configured to attach to a wheel and a motor;
the wheel configured to attach to a side or a center of the first frame and rotate about an axis;
the motor configured to connect to the wheel, wherein the motor is configured to rotate the wheel to propel the apparatus forward; and
a bracket configured to connect the first frame to a non-motorized vehicle, wherein:
the non-motorized vehicle is a bicycle and the bracket is configured to attach to a second frame of the bicycle, and wherein the apparatus is configured to propel the bicycle forward based on a speed of the motor;
the non-motorized vehicle is a scooter and the bracket is configured to attach to a third frame of the scooter, and wherein the apparatus is configured to propel the scooter forward based on the speed of the motor; or
the non-motorized vehicle is a skateboard and the bracket is configured to attach to a wheel bracket of the skateboard, and wherein the apparatus is configured to propel the skateboard forward based on the speed of the motor
further comprising a shaft extending from the motor and a roller attached to the end of the shaft, wherein the roller is in contact with the wheel to form a friction connection or pressure connection between the roller and the wheel such that when the motor rotates the roller, the roller rotates the first wheel.

20. The apparatus of claim 19, further comprising a controller configured to control a speed at which the motor rotates the first wheel.

* * * * *